(12) United States Patent
Zaydman

(10) Patent No.: US 11,182,295 B2
(45) Date of Patent: *Nov. 23, 2021

(54) COHERENCE PROTOCOL FOR DISTRIBUTED CACHES

(71) Applicant: VMware, Inc., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,474

(22) Filed: Jun. 30, 2020

(65) Prior Publication Data

US 2020/0334152 A1 Oct. 22, 2020

Related U.S. Application Data

(63) Continuation of application No. 16/198,975, filed on Nov. 23, 2018, now Pat. No. 10,719,444.

(51) Int. Cl.
*G06F 12/0815* (2016.01)
*G06F 12/12* (2016.01)

(52) U.S. Cl.
CPC ......... *G06F 12/0815* (2013.01); *G06F 12/12* (2013.01); *G06F 2212/1032* (2013.01); *G06F 2212/608* (2013.01)

(58) Field of Classification Search
CPC ............................ G06F 12/0815; G06F 12/12
See application file for complete search history.

(56) References Cited

U.S. PATENT DOCUMENTS

| 2002/0083275 | A1 | 6/2002 | Kawamoto et al. |
| 2004/0117579 | A1 | 6/2004 | Wu et al. |
| 2006/0095684 | A1* | 5/2006 | Shen .................. G06F 12/0826 711/146 |

* cited by examiner

*Primary Examiner* — David E Martinez

(57) ABSTRACT

The disclosure provides for a reactive cache coherence protocol that has efficiencies over proactive approaches. Rather than proactively performing remediation when a data item is invalidated, a destination endpoint checks cache coherence upon receiving an indication of a cache hit, and based at least on detecting a lack of coherence, performs a reactive remediation process. For example, the incoherence may be fixed by replacing, as a cached data item, a data block indicated by the cache hit with a replacement data block that triggered the cache hit.

20 Claims, 10 Drawing Sheets

COHERENCE PROTOCOL FOR DISTRIBUTED CACHES

CROSS-REFERENCE TO RELATED APPLICATIONS

This application is a continuation of U.S. patent application Ser. No. 16/198,975, filed Nov. 23, 2018, entitled "Coherence Protocol for Distributed Caches", the entirety of which is hereby incorporated by reference herein.

BACKGROUND

Cache coherence is the uniformity of shared resource data that ends up stored in multiple local caches. When different nodes in a multi-node processing architecture maintain caches of a common resource, problems may arise with incoherent data. For example, consider a scenario in which two different nodes (e.g., CPUs) have both cached a copy of a particular data block (e.g., a memory block). If the first node alters its local copy of the data block, and the second node is left with an invalid cache of the data block this results in a lack of coherence. Cache coherence manages conflicts by maintaining coherence of the data in the various multiple caches.

Another example is two nodes attempting to speed up network communication by caching hashes of previously transferred files. When a previously transferred file is modified or deleted, the cache on the destination may be updated by monitoring writes to the file in question. However, updating the cache on the source would require a network communication event, which consumes processing power and network bandwidth. If the network message is not properly received and processed, the different caches would become incoherent.

Common proactive cache coherence management dictates that when a first cache and a second cache become incoherent as a result of changes to the second cache, the changes are actively monitored and remediated by removing the now-invalid data item from the first cache. Such remediation work is wasted if the data item in the first cache is never hit again. Additionally, if the data item is subsequently encountered, it is no longer available in the cache for use. Therefore, proactive cache coherence management may not provide efficient operation in some scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An exemplary system for maintaining cache coherence comprises a teleporter configured to indicate a cache hit, and a destination endpoint coupled to the teleporter, wherein the destination endpoint is configured to, based at least on receiving an indication of the cache hit from the teleporter, check cache coherence and, based at least on detecting a lack of coherence, perform a reactive remediation process.

BRIEF DESCRIPTION OF THE DRAWINGS

The present description will be better understood from the following detailed description read in the light of the accompanying drawings, wherein.

DETAILED DESCRIPTION

Various aspects of the systems and methods described herein provide at least a reactive cache coherence protocol for distributed caches that has efficiencies over proactive approaches. Rather than proactively performing remediation when a data item is invalidated, a destination endpoint checks cache coherence upon receiving an indication of a cache hit, and based at least on detecting a lack of coherence, performs a reactive remediation process. For example, the incoherence may be fixed by replacing, as a cached data item, a data block indicated by the cache hit with a replacement data block that triggered the cache hit.

In this manner, the disclosure is able to maintain cache coherence by implementing a coherence protocol for distributed caches. Aspects of the disclosure provide for a reactive cache coherence protocol that has efficiencies over proactive approaches. Additionally, the disclosure is operable with cached disk images, memory pages, and/or database pages, as well as variable size blocks.

The disclosure operates in an unconventional manner by performing a reactive remediation process, rather than a proactive remediation process. This improves the functioning of the underlying computing device by reducing the amount of remediation work to perform, saving computing resources and improving the user experience.

It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in computing systems including virtualized computing environments.

Figure 1:
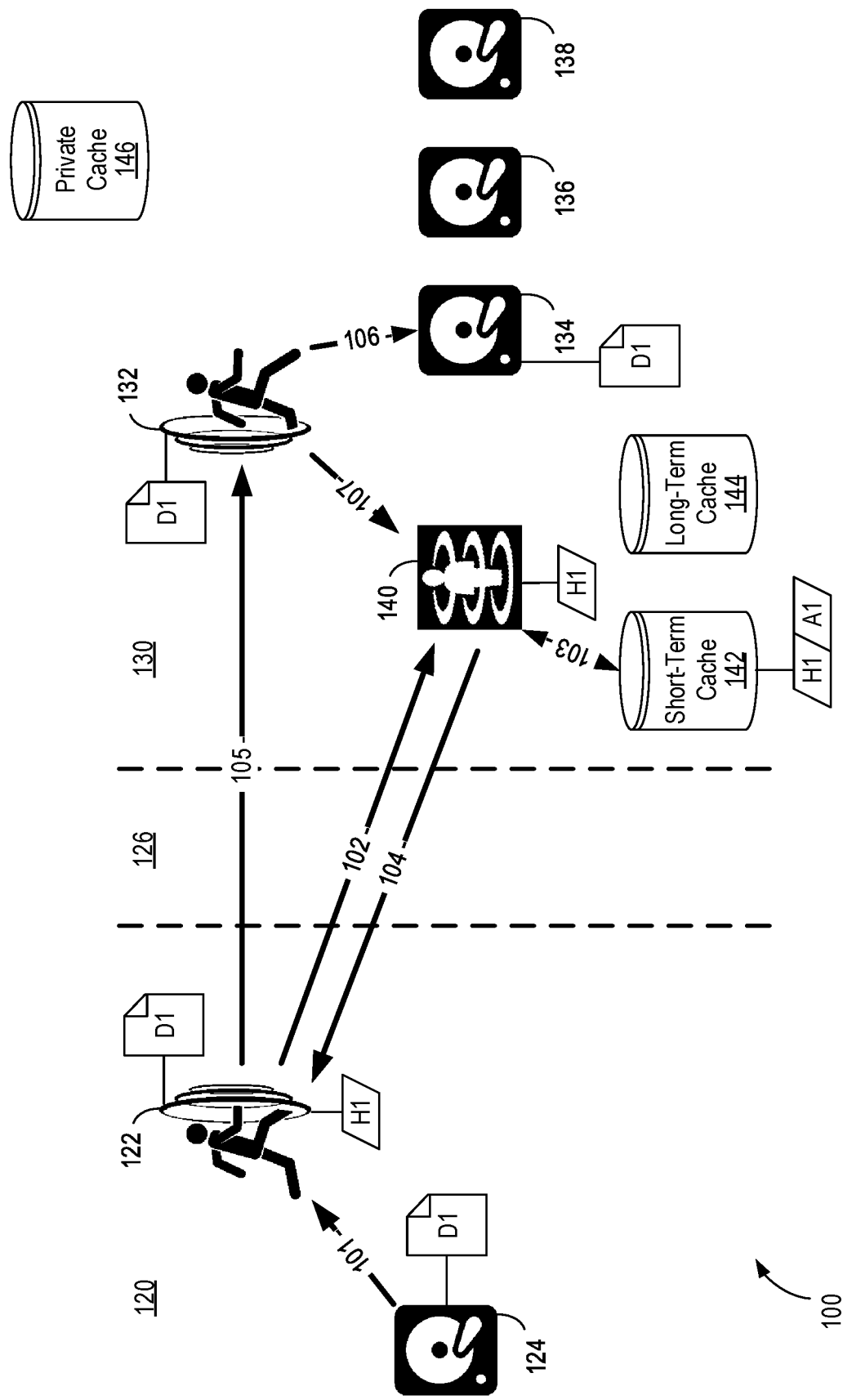
FIG. 1 illustrates a block diagram of an architecture for maintaining cache coherence, by implementing a coherence protocol for distributed caches, while transmitting a data block, according to an example embodiment.
Figure 4:
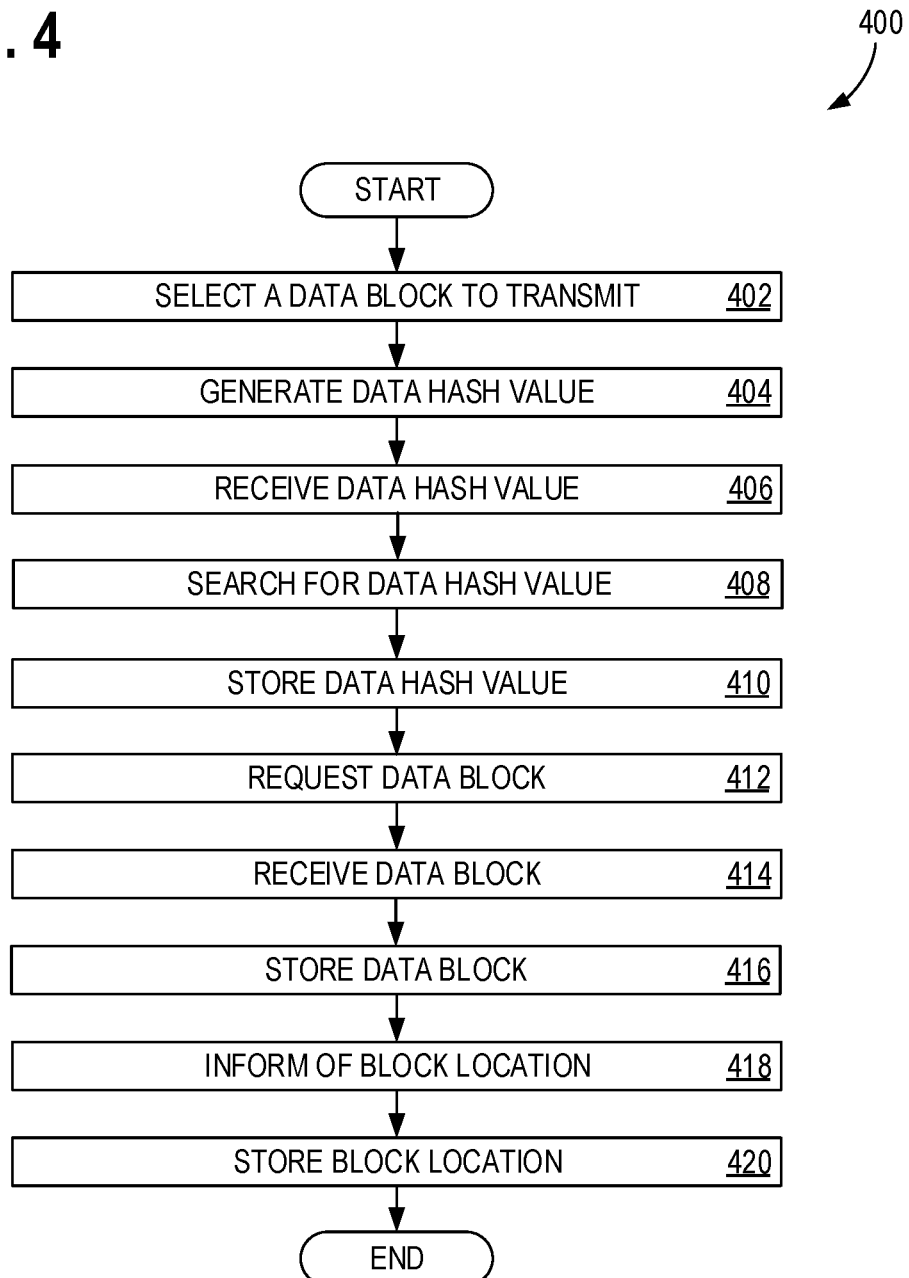
FIG. 4 illustrates a flowchart corresponding to the activity indicated in FIG. 1, according to an example embodiment.

FIG. 1 illustrates a block diagram of an architecture 100 for maintaining cache coherence, by implementing a coherence protocol for distributed caches, while transmitting a data block. In some examples, architecture 100 is able to perform deduplication of disk images during network transfer. FIG. 1 should be viewed along with FIG. 4, which illustrates a flowchart 400 corresponding to the activity indicated in FIG. 1.

Architecture 100 comprises a source node 120, a network 126, and a destination node 130. Coherence is to be maintained between node 120 and destination node 130. Source node 120 has a source endpoint 122 and source storage location 124. Destination node 130 has a destination endpoint 132, a first destination storage location 134, a second destination storage location 136, a third destination storage location 138, a private cache 146, and a teleporter 140, all coupled to destination endpoint 132. In some examples, storage locations 124, 134, 136, and 138 comprise disk images. Destination node 130 further has a short-term cache 142 and a long-term cache 144, both coupled to teleporter 140. Teleporter 140 is configured to indicate a cache hit to destination endpoint 132. Destination endpoint 132 is configured to, based at least on receiving an indication of a cache hit from teleporter 140, check cache coherence. Destination endpoint 132 is further configured to, based at least on detecting a lack of coherence, perform a reactive remediation process using a data block in a destination storage location.

In operation 402 (of FIG. 4) a data block D1 in source storage location 124 is selected to be transmitted to destination node 130 over network 126 using source endpoint 122, and is sent as message 101. In some examples, data block D1 is a memory page or a portion of memory. Data block D1 need not be a fixed size, but may vary in size, in some examples.

Source endpoint 122 hashes data block D1 to generate a data hash value H1 in operation 404. In some examples, data hash value H1 comprises a 256-bit hash, although different hash lengths may be used. Some considerations include that the hash value is sufficiently long to minimize the likelihood of a collisions, and that the calculation time be reasonably efficient. So, in some examples, the entirety of D1 may not be hashed. Teleporter 140 is configured to receive data hash values and receives data hash value H1 over network 126 as message 102, in operation 406. Based at least on teleporter 140 receiving data hash value H1, teleporter 140 searches within short-term cache 142 (as a first portion of message 103) and possibly also within long-term cache 144 for data hash value D1 and a matching block location, in operation 408. However, teleporter 140 cannot find data hash value H1, so teleporter 140 stores data hash value H1 as a second portion of message 103, in operation 410. Data block D1 is requested from source endpoint 122 via message 104, in operation 412. Source endpoint 122 then transmits data block D1 to destination endpoint 132 as message 105, and destination endpoint 132 receives data block D1 in operation 414.

Destination endpoint 132 then copies data block D1 received from source endpoint 122 to the destination storage location 134 as message 106, thereby storing data block D1, in operation 416. Additionally, destination endpoint 132 informs teleporter 140 of the location (A1) of data block D1 in destination storage location 134 as message 107, in operation 418. Teleporter 140 stores block location A1 in short-term cache 142 along with data hash value H1 as a third portion of message 103, in operation 420.

Figure 2A:
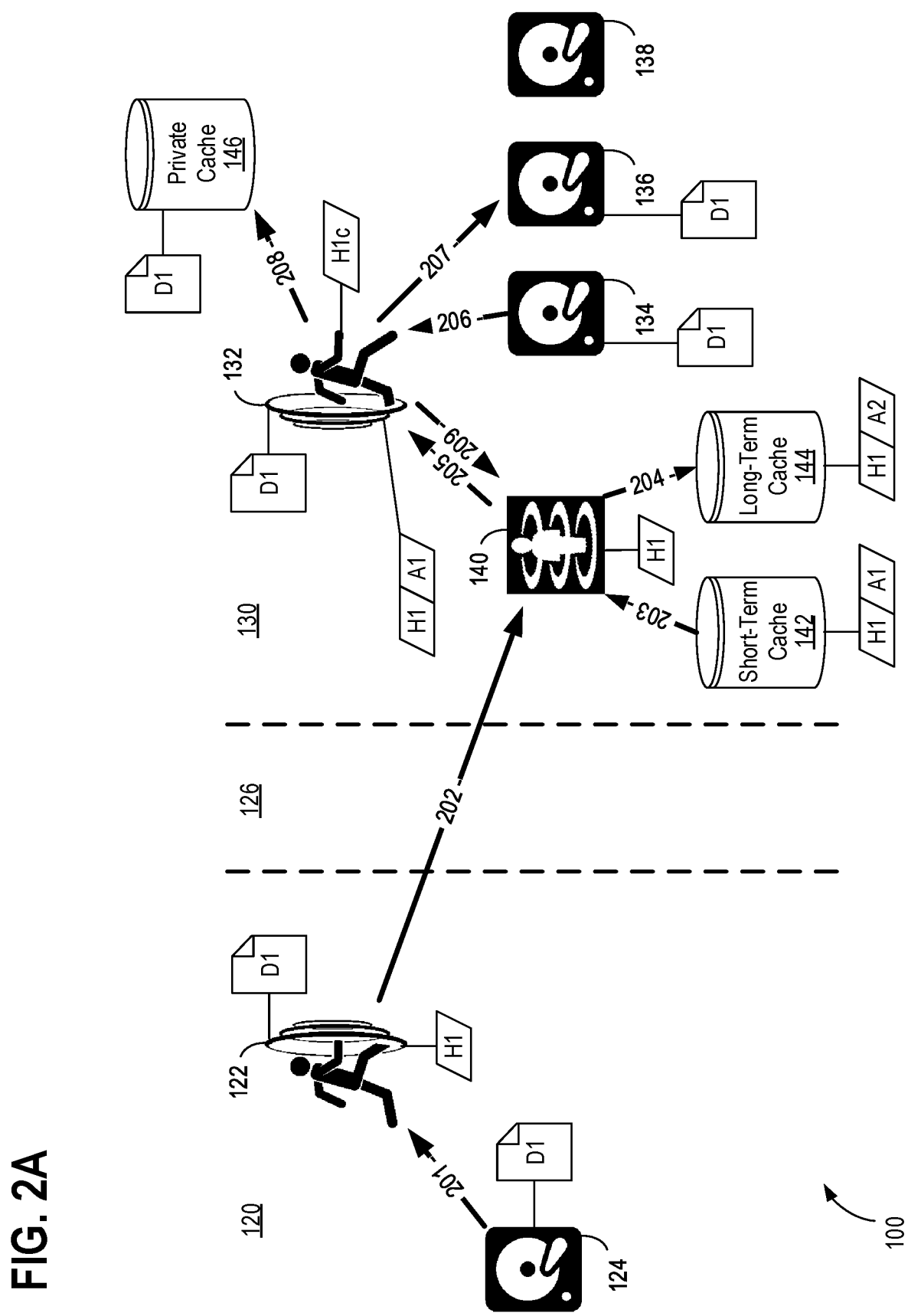
FIG. 2A illustrates the architecture of FIG. 1 in which a subsequent transmittal of the same data block results in a cache hit with coherency, according to an example embodiment.

FIG. 2A illustrates architecture 100 of FIG. 1 in which a subsequent transmittal of data block D1 results in a cache hit with coherency. FIG. 2A should be viewed along with FIG. 5, which illustrates a flowchart 500 corresponding to the activity indicated in FIGS. 2A and 2B. In operation 402 (of FIG. 5) data block D1 in source storage location 124 is again selected to be transmitted to destination node 130 over network 126 using source endpoint 122, and is sent as message 201. Source endpoint 122 hashes data block D1 to generate data hash value H1 in operation 404 (which matches data hash value H1 generated in operation 404 of FIG. 4). Teleporter 140 receives data hash value H1 over network 126 as message 202, in operation 406. In operation 408, based at least on teleporter 140 receiving data hash value H1, teleporter 140 searches within short-term cache 142 for data hash value H1 and matching block location A1, and also possibly in long-term cache 144. The results of the search are determined in operation 510. If teleporter 140 does not find data hash value H1 and matching block location block location A1, operation moves to operation 410 of flow chart 400 (if FIG. 4).

In operation 512, teleporter 140 finds data hash value H1 and matching block location block location A1 and receives them from short-term cache 142 as message 203. Based at least on teleporter 140 finding data hash value H1 and matching block location block location A1 in short-term cache 142, teleporter 140 promotes data hash value H1 from short-term cache 142 to long-term cache 144 as the first portion of message 204, in operation 514. Also based at least on teleporter 140 finding data hash value H1 and matching block location block location A1 in short-term cache 142, teleporter 140 indicates a cache hit to destination endpoint 132 as message 205, in operation 516. In some examples, indicating a cache hit comprises, based at least on finding matching block location A1, indicating to destination endpoint 132 data hash value H1 and matching block location A1. In operation 518, destination endpoint 132 receives the indication of the cache hit from teleporter 140. In some examples, receiving, at a destination endpoint, an indication of a cache hit from a teleporter comprises receiving, from the teleporter, a data hash value and a matching block location.

Based at least on receiving the indication of the cache hit, destination endpoint 132 begins checking cache coherence. Checking cache coherence comprises operations 520-524. In the scenario depicted in FIG. 2A, data block D1 is intact and has not changed. In operation 520, destination endpoint 132 retrieves data block D1 found at matching block location A1 in destination storage location 134, as message 206. In operation 522, destination endpoint 132 generates a check hash value H1c for data block D1 found at matching block location A1 in destination storage location 134. Check hash value H1c will use the same hash function as was used to generate the data hash value, so in some examples, the check hash value comprises a 256-bit hash. In operation 524, destination endpoint 132 compares check hash value H1c with data hash value H1. Because, in this scenario, data block D1 is intact and has not changed, decision operation 526 indicates that check hash value H1c matches data hash value H1. This is an indication of coherence. The lack of coherence scenario is described in relation to FIG. 2B.

Based at least on check hash value H1c matching data hash value H1, destination endpoint 132 copies data block D1 found at matching block location A1 to destination storage location 136 as message 207, in operation 528. Also based at least on check hash value H1c matching data hash value H1, destination endpoint 132 copies data block D1 found at matching block location A1 to private cache 146 (in a new location A2) as message 208, in operation 530. Additionally, destination endpoint 132 informs teleporter 140 of the new block location A2 of data block D1 in private cache 146 as message 209, in operation 532. Teleporter 140 stores block location A2 in long-term cache 144 along with data hash value H1 as a second portion of message 204, in operation 534.

Figure 2B:
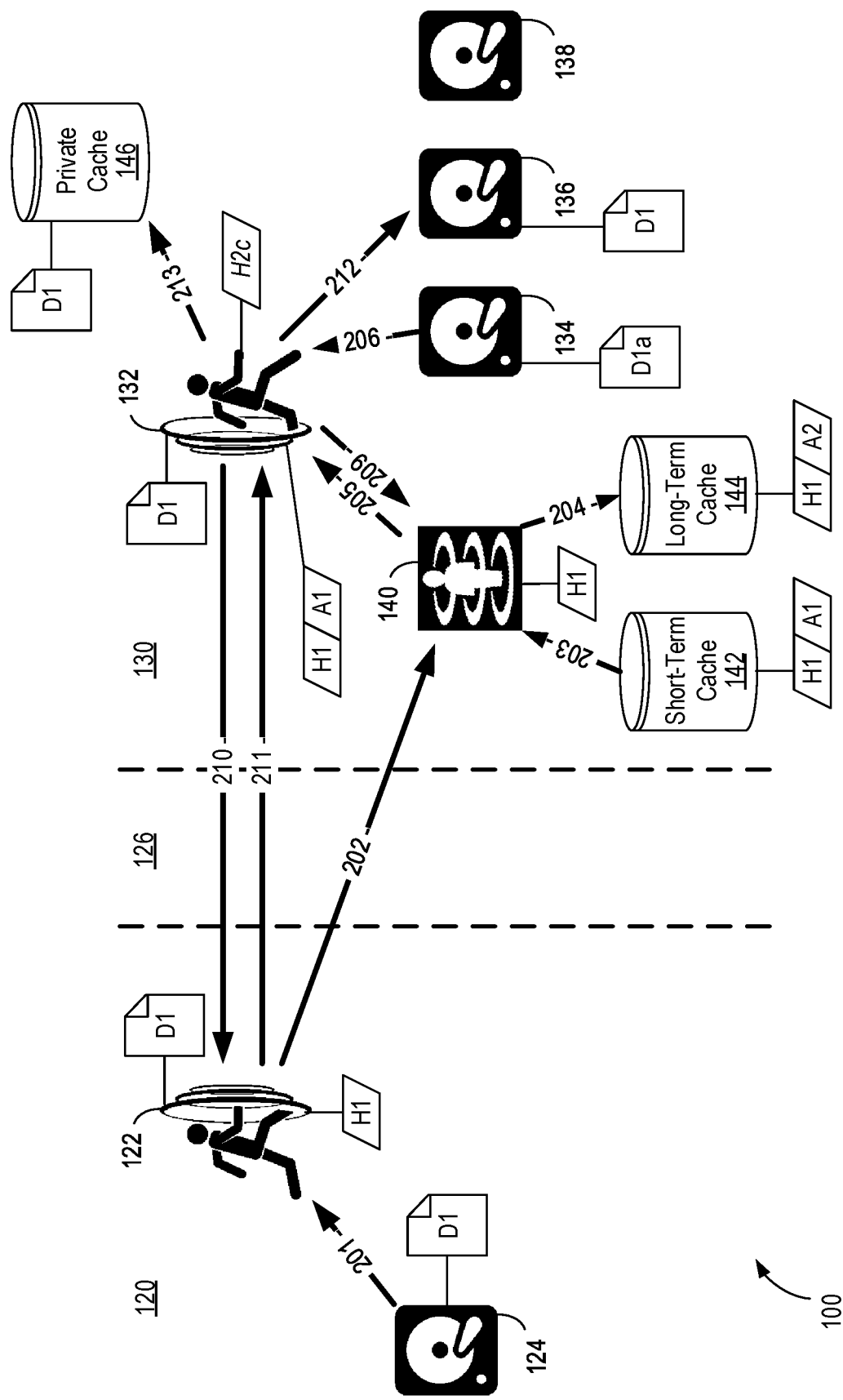
FIG. 2B illustrates the architecture of FIG. 1 in which a subsequent transmittal of the same data block results in a cache hit with a lack of coherency, according to an example embodiment.
Figure 5:
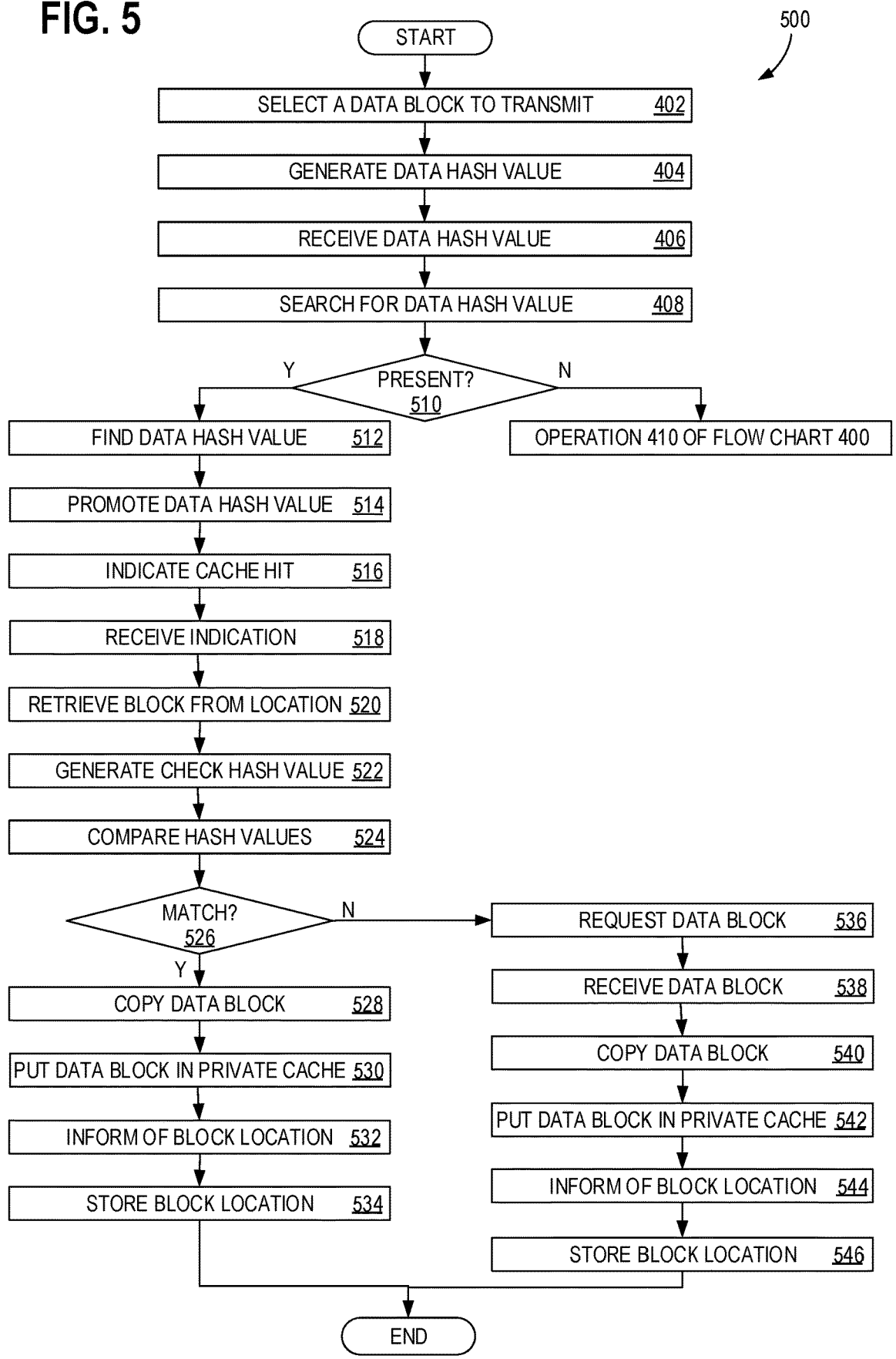
FIG. 5 illustrates a flowchart corresponding to the activity indicated in FIGS. 2A and 2B, according to an example embodiment.

Turning now to FIG. 2B, and still with reference to FIG. 5, in this scenario, data block D1 has been changed. The data block copy in destination storage location 134 is labeled as D1a and the check hash value is labeled as H2c to indicate that they are no longer the same as in FIG. 2A. Thus, decision operation 526 indicates that check hash value H2c does not match data hash value H1. This is an indication of lack of coherence. Based at least on detecting a lack of coherence, architecture 100 performs a reactive remediation process using data block D1 and/or data block D1a.

Based at least on check hash value H2c not matching data hash value H1, data block D1 is requested from source endpoint 122 via message 210, in operation 536. Source endpoint 122 then transmits data block D1 to destination endpoint 132 as message 211, and destination endpoint 132 receives data block D1 in operation 538. Also based at least on check hash value H2c not matching data hash value H1, destination endpoint 132 copies data block D1 received from source endpoint 122 to destination storage location 136 as message 212, in operation 540. Destination endpoint 132 then copies data block D1 received from source endpoint 122 to private cache 146 (in a new location A2) as message 213, in operation 542. Additionally, destination endpoint 132 informs teleporter 140 of the new block location A2 of data block D1 in private cache 146 as message 209, in operation 544. Teleporter 140 stores block location A2 in long-term cache 144 along with data hash value H1 as a second portion of message 204, in operation 546. Operations 536-546 together comprise, based at least on detecting a lack of coherence, performing a reactive remediation process. In this manner the remediation process comprises replacing, as a cached data item, data block D1a indicated by the cache hit with replacement data block D1 that triggered the cache hit.

It should be noted that the end result of the scenarios depicted in both FIGS. 2A and 2B are the same: data hash value H1 and block location A2 are in long-term cache 144, and data block D1 is in private cache 146. That is, independently of whether decision operation 526 detected cache coherence or lack of coherence, the end result was still cache coherence. Coherence is not checked until a cache hit was experienced, and incoherence is detected by comparing hashes. Incoherence is fixed by replacing the cache item that was invalidated with the new item that has caused the cache hit. This is a reactive, as-needed remediation approach, which may be contrasted with proactive invalidation.

Figure 3:
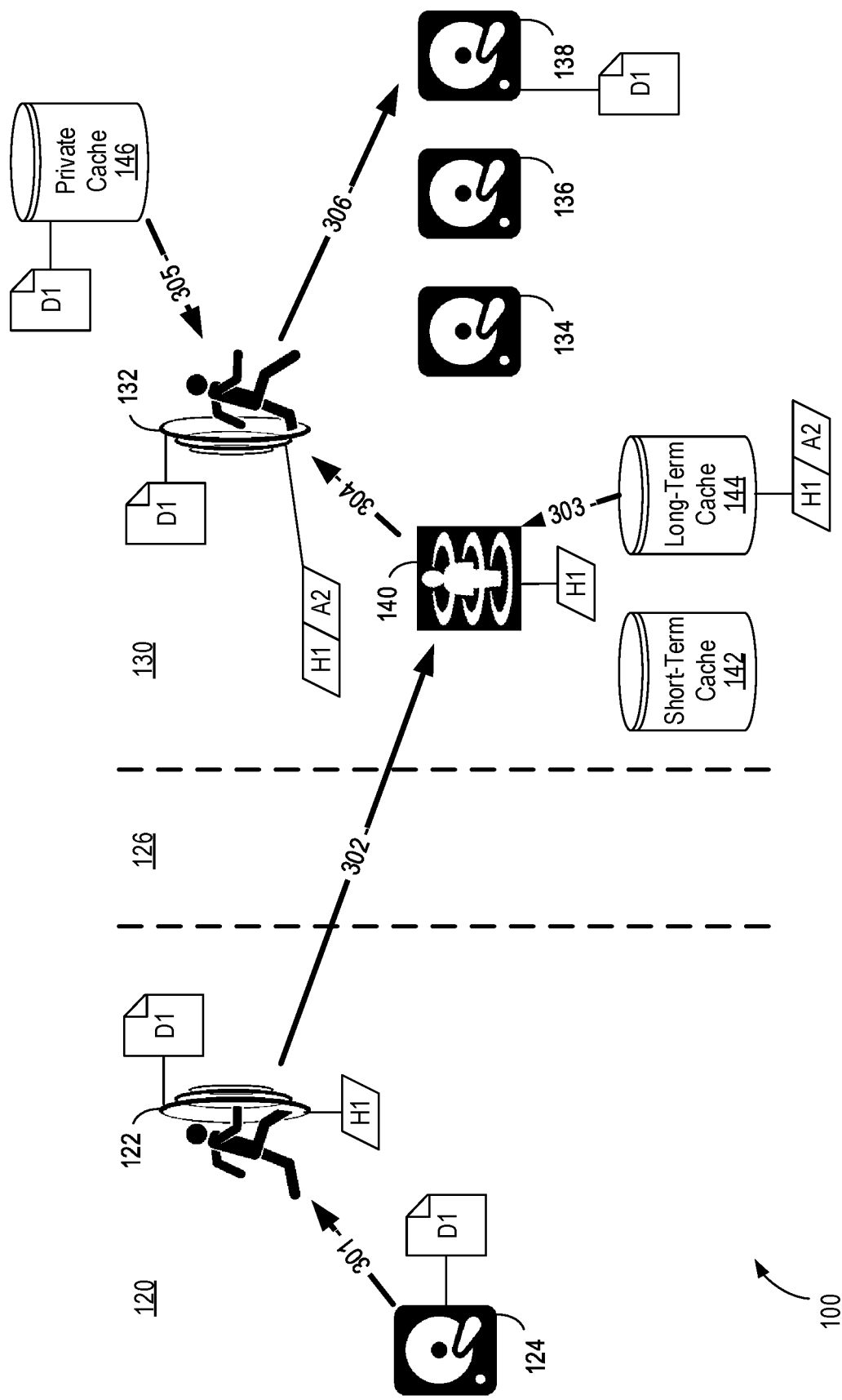
FIG. 3 illustrates the architecture of FIG. 1 in which a further subsequent transmittal of the same data block results in a cache hit, according to an example embodiment.
Figure 6:
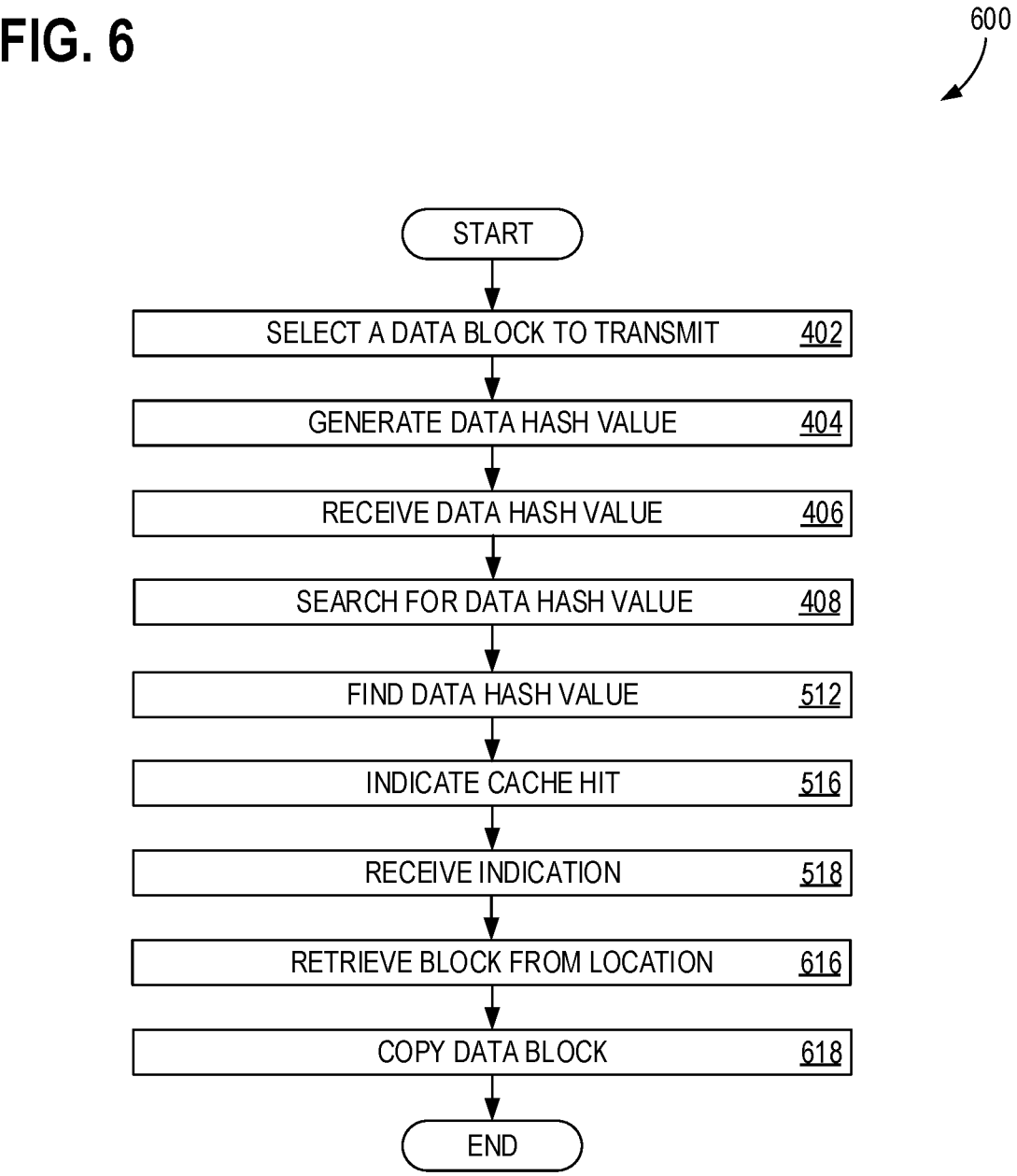
FIG. 6 illustrates a flowchart corresponding to the activity indicated in FIG. 3, according to an example embodiment.

FIG. 3 illustrates architecture 100 of FIG. 1 in which a further subsequent transmittal of data block D1 results in a cache hit. FIG. 3 should be viewed along with FIG. 6, which illustrates a flowchart 600 corresponding to the activity indicated in FIG. 3. In operation 402 (of FIG. 6) data block D1 in source storage location 124 is yet again selected to be transmitted to destination node 130 over network 126 using source endpoint 122, and is sent as message 301. Source endpoint 122 hashes data block D1 to generate data hash value H1 in operation 404. Teleporter 140 receives data hash value H1 over network 126 as message 302, in operation 406. Based at least on teleporter 140 receiving data hash value H1, teleporter 140 searches within long-term cache 144, and possibly also within short-term cache 142 for data hash value D1 and a matching block location, in operation 408.

In operation 512, teleporter 140 finds data hash value H1 and matching block location block location A2 and receives them from long-term cache 144 as message 303. Based at least on teleporter 140 finding data hash value H1 and matching block location block location A2 in long-term cache 144, teleporter 140 indicates a cache hit to destination endpoint 132 as message 304, in operation 516. In operation 518, destination endpoint 132 receives the indication of the cache hit from teleporter 140.

Because matching block location block location A2 indicates a location within private cache 146, and the contents of private cache 146 are expected to remain unchanged, in some examples, checking coherency by comparing hash values may not be needed. In operation 616, destination endpoint 132 retrieves data block D1 found at matching block location A2 in private cache 146, as message 305. In operation 618, destination endpoint 132 then copies data block D1 from private cache 146 (found at matching block location A2) to destination storage location 138, as message 306.

Figure 7:
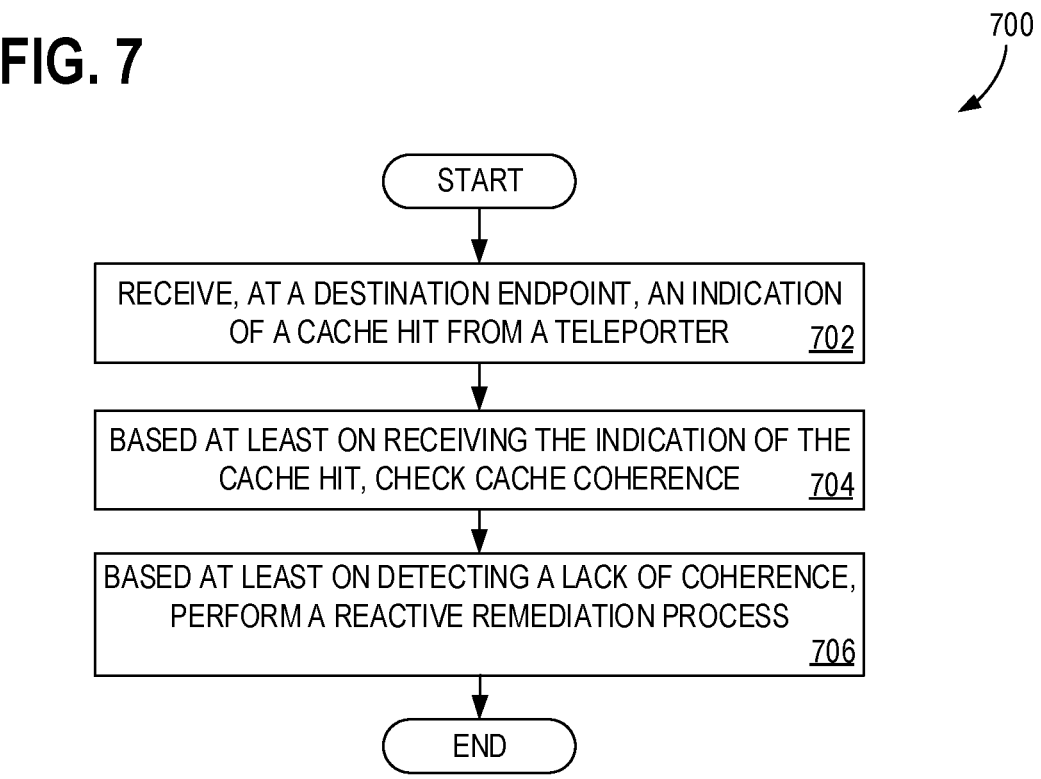
FIG. 7 illustrates a flowchart showing a method for maintaining cache coherence, according to an example embodiment that may be used with the architecture of FIG. 1.

FIG. 7 illustrates a flowchart 700 showing a method for maintaining cache coherence, that may be used with the architecture of FIG. 1. Operation 702 includes receiving, at a destination endpoint, an indication of a cache hit from a teleporter. Operation 704 includes, based at least on receiving the indication of the cache hit, checking cache coherence. Operation 706 includes, based at least on detecting a lack of coherence, performing a reactive remediation process. In some examples, performing a reactive remediation process in operation 706 comprises replacing, as a cached data item, a data block in a first destination storage location indicated by the cache hit with a replacement data block that triggered the cache hit.

Figure 8:
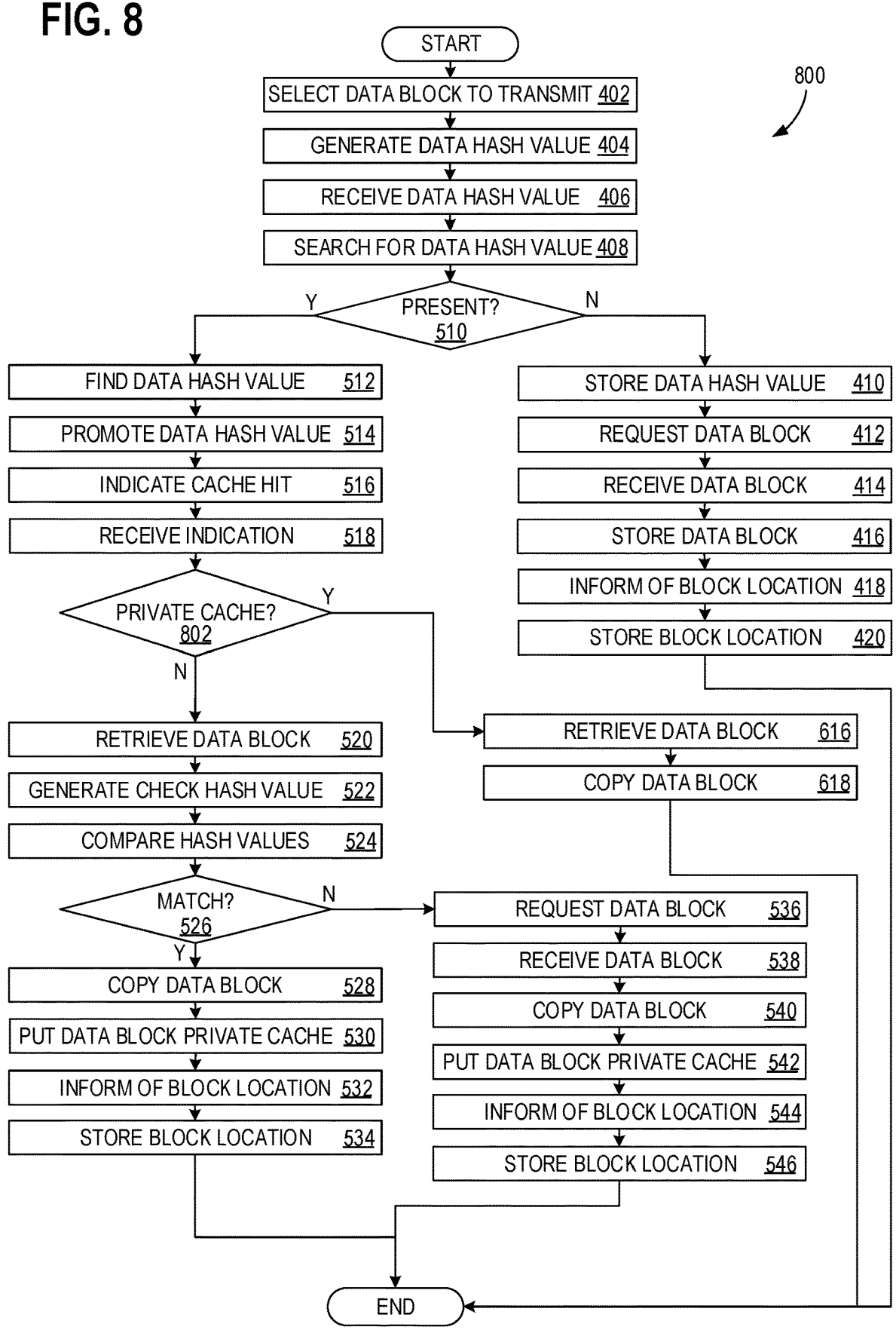
FIG. 8 illustrates a flowchart showing another method for maintaining cache coherence, according to an example embodiment that may be used with the architecture of FIG. 1.

FIG. 8 illustrates a flowchart 800 showing a method for maintaining cache coherence, that may be used with the architecture of FIG. 1. Flowchart 800 combines the operations of flow charts 400, 500, and 600. In operation 402 a data block D1 is selected to be transmitted to destination node 130. Source endpoint 122 hashes data block D1 in operation 404. Teleporter 140 receives data hash value H1 over network 126 from source endpoint 122 in operation 406. Based at least on teleporter 140 receiving data hash value H1, teleporter 140 searches within short-term cache 142 and/or within long-term cache 144 for data hash value D1 and a matching block location, in operation 408. The results of the search are determined in operation 510.

If teleporter 140 does not find data hash value H1 and a matching block location block location, operation moves storing data hash value H1, in operation 410. Data block D1 is requested from source endpoint 122, in operation 412. Source endpoint 122 then transmits data block D1 to destination endpoint 132, and destination endpoint 132 receives data block D1 in operation 414. Destination endpoint 132 then copies data block D1 to the destination storage location 134, thereby storing data block D1, in operation 416. Additionally, destination endpoint 132 informs teleporter 140 of the location of data block D1, in operation 418. Teleporter 140 stores block location A1 in short-term cache 142 along with data hash value H1, in operation 420.

If, however, data hash value H1 and a matching block location block location (A1 or A2) are present in a cache, teleporter 140 finds them in operation 512. If the matching block location block location had been in short-term cache 142, teleporter 140 promotes data hash value H1 from short-term cache 142 to long-term cache 144, in operation 514. Teleporter 140 indicates the cache hit to destination endpoint 132 in operation 516, and destination endpoint 132 receives the indication of the cache hit from teleporter 140 in operation 518. In some examples, receiving, at a destination endpoint, an indication of a cache hit from a teleporter comprises receiving, from the teleporter, a data hash value and a matching block location.

In decision operation 802, teleporter determines whether the matching block location block location is within private cache 146. If so, then checking coherency by comparing hash values may not be needed. In operation 616, destination endpoint 132 retrieves data block D1 (found at matching block location A2) from private cache 146. In operation 618, destination endpoint 132 then copies data block D1 from private cache 146 to destination storage location 138.

Operations 520-546 are as previously described for FIG. 5. Operations 536-546 together comprise, based at least on detecting a lack of coherence, performing a reactive remediation process. In this manner the remediation process comprises replacing, as a cached data item, data block D1$a$ indicated by the cache hit with replacement data block D1 that triggered the cache hit.

Figure 9:
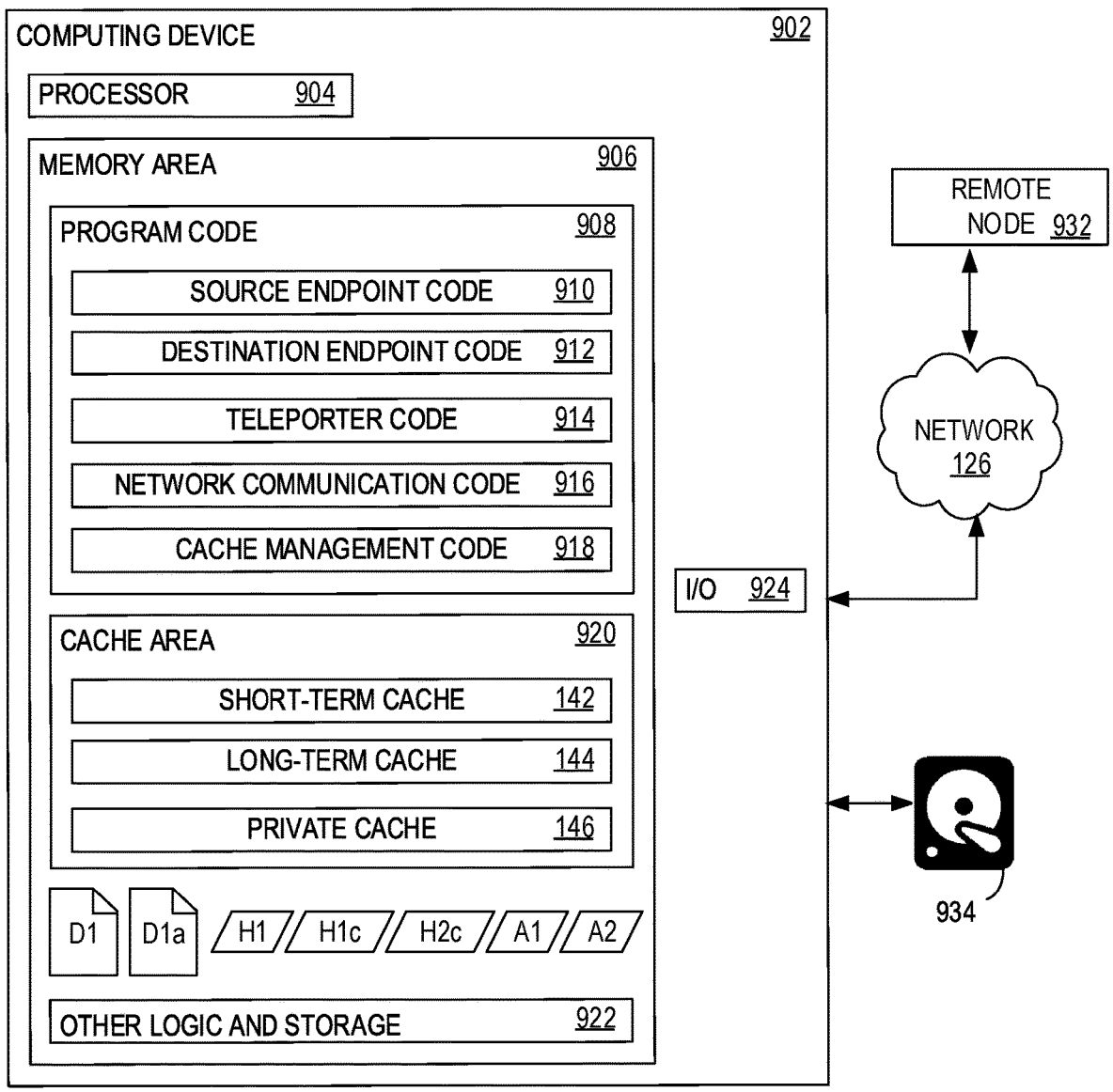
FIG. 9 illustrates a block diagram of a computing device that employs caching, and that may be used with the architecture of FIG. 1, according to an example embodiment.

FIG. 9 illustrates a block diagram 900 of a computing device 902 that employs caching, and that may be used with the architecture of FIG. 1. With reference to FIG. 1, computing device 902 may be used for any of source node 120, source endpoint 122, source storage location 124, destination node 130, destination endpoint 132, first destination storage location 134, second destination storage location 136, third destination storage location 138, private cache 146, teleporter 140, short-term cache 142, and a long-term cache 144.

Computing device 902 has at least a processor 904 and a memory area 906 that holds program code 908, a cache area 920, and other logic and storage 922. Memory area 906 is any device allowing information, such as computer executable instructions and/or other data, to be stored and retrieved. For example, memory area 906 may include one or more random access memory (RAM) modules, flash memory modules, hard disks, solid-state disks, and/or optical disks. Program code 908 comprises computer executable instructions, and computer executable components comprising source endpoint code 910, destination endpoint code 912, teleporter code 914, network communication code 916, and cache management code 918. Source endpoint code 910 enables computing device 902 to operate as source endpoint 122. Destination endpoint code 912 enables computing device 902 to operate as destination endpoint 132. Teleporter code 914 enables computing device 902 to operate as teleporter 140. Network communication code 916 may be used when computing device 902 is operating as any of source endpoint 122, destination endpoint 132, and teleporter 140. Cache management code 918 may be used when computing device 902 is operating as either of destination endpoint 132 and teleporter 140. Cache area 920 may hold any of short-term cache 142, long-term cache 144, and private cache 146. As illustrated, any of data block D1, data block D1$a$, data hash value H1, check hash value H1, block location A1, and block location A2, may be in memory area 906.

An input/output (I/O) module 924 permits communication over network 126 to a remote node 932, which may be another manifestation of computing device 902. A storage location 934, coupled to computing device 902, may be any of source storage location 124, destination storage location 134, destination storage location 136, and third destination storage location 138, and/or may hold any of private cache 146, short-term cache 142, and long-term cache 144.

Computing device 902 represent any device executing instructions (e.g., as application programs, operating system functionality, or both) to implement the operations and functionality described herein. Computing device 902 may include any portable or non-portable device including a mobile telephone, laptop, tablet, computing pad, netbook, gaming device, portable media player, desktop personal computer, kiosk, and/or tabletop device. Additionally, computing device 902 may represent a group of processing units or other computing devices, such as in a cloud computing system or service. Processor 904 may include any quantity of processing units and may be programmed to execute any components of program code 908 comprising computer executable instructions for implementing aspects of the disclosure. In some embodiments, processor 904 is programmed to execute instructions such as those illustrated in the figures.

Additional Examples

An example system for maintaining cache coherence may comprise: a teleporter configured to indicate a cache hit; a first destination storage location; and a destination endpoint coupled to the teleporter and the first destination storage location, the destination endpoint configured to: based at least on receiving an indication of the cache hit from the teleporter, check cache coherence; and based at least on detecting a lack of coherence, perform a reactive remediation process using a data block in the first destination storage location.

Another example system for maintaining cache coherence may comprise: a teleporter configured to indicate a cache hit; a first destination storage location; and a destination endpoint coupled to the teleporter and the first destination storage location, the destination endpoint configured to: based at least on receiving an indication of the cache hit from the teleporter, check cache coherence; and based at least on detecting a lack of coherence, perform a reactive remediation process to maintain cache coherency by replacing, as a cached data item, a data block in the first destination storage location indicated by the cache hit with a replacement data block that triggered the cache hit.

An exemplary method of maintaining cache coherence may comprise: receiving, at a destination endpoint, an indication of a cache hit from a teleporter; based at least on receiving the indication of the cache hit, checking cache coherence; and based at least on detecting a lack of coherence, performing a reactive remediation process using a data block in a first destination storage location.

Another exemplary method of maintaining cache coherence may comprise: receiving, at a destination endpoint, an indication of a cache hit from a teleporter; based at least on receiving the indication of the cache hit, checking cache coherence; and based at least on detecting a lack of coherence, performing a reactive remediation process to maintain cache coherency by replacing, as a cached data item, a data block in a first destination storage location indicated by the cache hit with a replacement data block that triggered the cache hit.

One or more exemplary non-transitory computer storage media having computer-executable instructions that, upon execution by a processor, may cause the processor to at least perform operations that comprise: receiving, from a source endpoint, a data hash value; based at least on the teleporter receiving the data hash value, searching within a first teleporter cache for the data hash value and a matching block location; receiving, at a destination endpoint, an indication of a cache hit from a teleporter, the indication of the cache hit comprising the data hash value and the matching block location; based at least on receiving the indication of the cache hit, generating a check hash value for a data block found at the matching block location; comparing the check hash value with the data hash value; promoting the data hash value from a short-term cache to a long-term cache; based at least on the check hash value matching the data hash value, copying the data block found at the matching block location to a first destination storage location and copying the data block found at the matching block location to a private cache; based at least on the check hash value not matching the data hash value, copying a data block received from the source endpoint to the first destination storage location and copying the data block received from the source endpoint to the private cache; and copying a data block from the private cache to a second destination storage location.

Alternatively, or in addition to the other examples described herein, examples include any combination of the following:
- the remediation process comprises: replacing, as a cached data item, a data block indicated by the cache hit with a replacement data block that triggered the cache hit;
- receiving an indication of a cache hit from the teleporter comprises receiving, from the teleporter, a data hash value and a matching block location; and checking cache coherence comprises generating a check hash value for a data block found at the matching block location; and comparing the check hash value with the data hash value;
- the data hash value comprises a 256-bit hash;
- the check hash value comprises a 256-bit hash;
- a first teleporter cache coupled to the teleporter;
- the first teleporter cache comprises a short-term cache;
- the teleporter is further configured to receive the data hash value;
- receiving, at the teleporter, the data hash value;
- based at least on the teleporter receiving the data hash value, search within the first teleporter cache for the data hash value and the matching block location;
- indicating a cache hit comprises, based at least on finding the matching block location, indicating to the destination endpoint the data hash value and the matching block location;
- a long-term cache coupled to the teleporter;
- promoting the data hash value from the short-term cache to the long-term cache;
- a second destination storage location coupled to the destination endpoint;
- the destination endpoint is further configured to, based at least on the check hash value matching the data hash value, copy the data block found at the matching block location to the second destination storage location;
- the destination endpoint is further configured to, based at least on the check hash value not matching the data hash value, copy a data block received from a source endpoint to the second destination storage location;
- a private cache coupled to the destination endpoint;
- the remediation process comprises copying a data block to the private cache;
- copying a data block to the private cache comprises, based at least on the check hash value matching the data hash value, copying the data block found at the matching block location to the private cache;
- copying a data block to the private cache comprises, based at least on the check hash value not matching the data hash value, copying a data block received from a source endpoint to the private cache;
- the teleporter receiving the data hash value comprises the teleporter receiving the data hash value from the source endpoint;
- a third destination storage location coupled to the destination endpoint;
- the destination endpoint is further configured to copy a data block from the private cache to the third destination storage location; and
- copying a data block from the private cache to a third destination storage location.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for maintaining cache coherence. For example, the elements illustrated in the figures, such as when encoded to perform the operations illustrated in the figures, constitute exemplary means for checking cache coherence based at least on receiving an indication of a cache hit from a teleporter, and exemplary means for performing a reactive remediation process using a data block in a first destination storage location based at least on detecting a lack of coherence.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for maintaining cache coherence, the method comprising:
   receiving, at a destination endpoint, an indication of a cache hit from a teleporter;
   based at least on receiving the indication of the cache hit, checking cache coherence; and
   based at least on detecting a lack of coherence, performing a reactive remediation process using a data block in a first destination storage location.

2. The method of claim 1, wherein the reactive remediation process comprises:
   replacing, as a cached data item, a data block indicated by the cache hit with a replacement data block that triggered the cache hit.

3. The method of claim 1, wherein receiving, at the destination endpoint, the indication of the cache hit from the teleporter comprises:
   receiving, from the teleporter, a data hash value and a matching block location; and
   wherein checking cache coherence comprises:
      generating a check hash value for a data block found at the matching block location; and
      comparing the check hash value with the data hash value.

4. The method of claim 3, wherein the data hash value comprises a 256-bit hash.

5. The method of claim 3, wherein the check hash value comprises a 256-bit hash.

6. The method of claim 3, further comprising:
   based at least on the check hash value matching the data hash value, copying the data block found at the matching block location to a second destination storage location; and
   based at least on the check hash value not matching the data hash value, copying a data block received from a source endpoint to the second destination storage location.

7. The method of claim 3, wherein the remediation process comprises:
   promoting the data hash value from a short-term cache to a long-term cache.

8. A computer system for maintaining cache coherence, the computer system comprising:
   a teleporter configured to indicate a cache hit;
   a first destination storage location; and a destination endpoint coupled to the teleporter and the first destination storage location, the destination endpoint configured to:
    based at least on receiving an indication of the cache hit from the teleporter, check cache coherence; and
    based at least on detecting a lack of coherence, perform a reactive remediation process using a data block in the first destination storage location.

9. The computer system of claim 8, wherein the remediation process comprises:
    replacing, as a cached data item, a data block indicated by the cache hit with a replacement data block that triggered the cache hit.

10. The computer system of claim 8, wherein receiving, at the destination endpoint, the indication of the cache hit from the teleporter comprises:
    receiving, from the teleporter, a data hash value and a matching block location; and
    wherein checking cache coherence comprises:
        generating a check hash value for a data block found at the matching block location; and
        comparing the check hash value with the data hash value.

11. The computer system of claim 10, wherein the data hash value comprises a 256-bit hash.

12. The computer system of claim 10, wherein the check hash value comprises a 256-bit hash.

13. The computer system of claim 10, wherein the destination endpoint is further configured to:
    based at least on the check hash value matching the data hash value, copy the data block found at the matching block location to a second destination storage location; and
    based at least on the check hash value not matching the data hash value, copy a data block received from a source endpoint to the second destination storage location.

14. The computer system of claim 10, wherein the remediation process comprises:
    promoting the data hash value from a short-term cache to a long-term cache.

15. A non-transitory computer storage medium having computer-executable instructions that, upon execution by a processor, cause the processor to at least perform operations to maintain cache coherence, the operations comprising:
    receiving, at a destination endpoint, an indication of a cache hit from a teleporter;
    based at least on receiving the indication of the cache hit, checking cache coherence; and
    based at least on detecting a lack of coherence, performing a reactive remediation process using a data block in a first destination storage location.

16. The non-transitory computer storage medium of claim 15, wherein the remediation process comprises:
    replacing, as a cached data item, a data block indicated by the cache hit with a replacement data block that triggered the cache hit.

17. The non-transitory computer storage medium of claim 15, wherein receiving, at the destination endpoint, the indication of the cache hit from the teleporter comprises:
    receiving, from the teleporter, a data hash value and a matching block location; and
    wherein checking cache coherence comprises:
        generating a check hash value for a data block found at the matching block location; and
        comparing the check hash value with the data hash value.

18. The non-transitory computer storage medium of claim 17, wherein the data hash value comprises a 256-bit hash, and wherein the check hash value comprises a 256-bit hash.

19. The non-transitory computer storage medium of claim 17, wherein the computer-executable instructions further cause the processor to perform operations comprising:
    based at least on the check hash value matching the data hash value, copying the data block found at the matching block location to a second destination storage location; and
    based at least on the check hash value not matching the data hash value, copying a data block received from a source endpoint to the second destination storage location.

20. The non-transitory computer storage medium of claim 17, wherein the remediation process comprises:
    promoting the data hash value from a short-term cache to a long-term cache.

* * * * *